Patented June 25, 1940

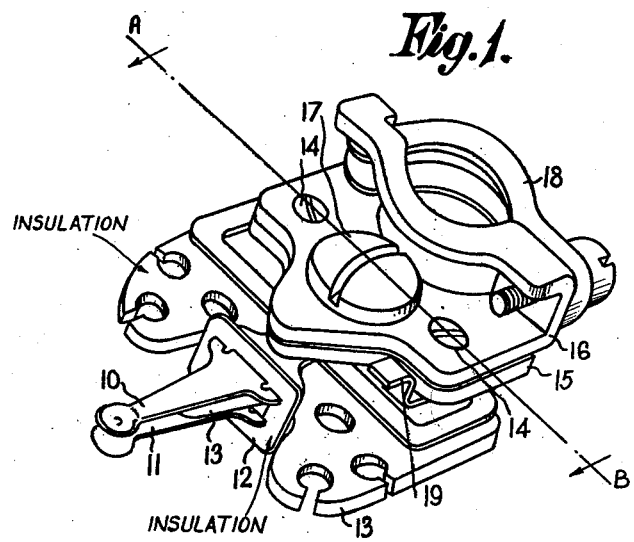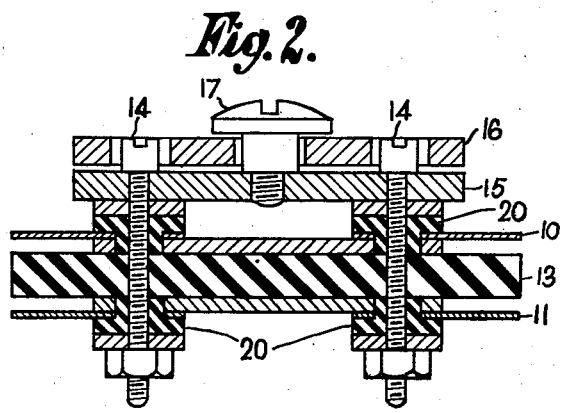

2,205,587

UNITED STATES PATENT OFFICE 2,205,587

AUTOMATIC SWITCH

Denis Wright, Liverpool, England, assignor to Associated Telephone & Telegraph Company, Chicago, Ill., a corporation of Delaware Application March 27, 1937, Serial No. 133,338
In Great Britain April 6, 1936

6 Claims. (Cl. 200—166)

The present invention relates to automatic switches for use in telephone or like systems and is more particularly concerned with improved mounting arrangements for the wipers of such switches with a view to giving more reliable contact and thus reducing the tendency for vibration or shock to produce microphonic noise.

In general when a switch wiper tip is set on a fixed bank contact, if either the contact bank or the wiper is caused by some means to vibrate independently of the other, the resulting disturbance of the contact between the wiper tip and the fixed contact is likely to give rise to microphonic noises if the circuit in which the wiper is connected carries speech currents. In practice in a telephone installation a number of switches and their associated contact banks may be mounted side by side on a shelf member and the actuation of any one switch will communicate vibration to the other switches. So long as the frequency and phase of the vibrations produced are the same for any switch and its associated contact bank, no microphonic noise will be produced since there will be no relative movement between the switch wipers and the particular bank contact upon which they are resting. Due probably to the bearing clearances required however, a switch shaft in a disturbed switch will tend to execute mechanical vibrations which may differ from those imparted to the switch as a whole and if therefore the wiper assembly is rigidly fixed to the shaft, vibration imparted to it through the shaft which differs in frequency from that imparted to the contact bank and the switch as a whole will result in variation of contact pressure with a likelihood of resulting microphonic noise.

According to the invention this trouble is overcome in that the support for the wipers is loosely mounted on the wiper carriage by means of a connection which does not transmit mechanical vibration. According to a further feature of the invention this connection involves the use of a film of oil or similar liquid whereby the two members are mechanically insulated from one another.

The invention will be better understood from the following description of one method of carrying it into effect, reference being had to the accompanying drawing comprising Figs. 1 and 2. Fig. 1 shows a perspective view of a wiper assembly suitable for a vertical and rotary switch and of the so-called linked-tip type which is described in detail in R. N. Saxby's application, Serial No. 76,375, filed April 25, 1936. Fig. 2 shows a vertical cross-sectional view of the wiper assembly along the line A—B in Fig. 1. This figure serves to show more clearly the methods adopted for securing that the wiper support is mechanically insulated from the carriage.

It will be seen from the drawing that the wiper assembly is mounted on a flat plate member 15 loosely supported by means of a flanged screw 17 from the upper plate member 16 one end of which is bent over and so shaped as to co-operate with the semi-circular bracket member 18 in order to provide a suitable clamping means to the tubular wiper carriage or shaft of the switch. The wiper blades 10 and 11 are mounted on opposite sides of a plate of insulating material 13, the complete wiper assembly being secured to the lower plate 15 by two screws 14 and insulating washers 20. The insulating plate 13 is extended forwardly between the wipers so as to prevent contact between them and also serves to limit any vibration which may develop during vertical stepping owing to the extreme flexibility of the blades. Each of the blades is formed as a single pressing of brass or other suitable material while the tips are spoon-shaped so minimise wear and the possibility of catching contacts in adjacent levels. Furthermore the blades are linked together at their free ends by means of an insulating washer 12 which tends to localise the pressure at the tips so that it is maintained substantially constant on both blades over an appreciable arc of movement of the blades about an axis transverse to the shaft. The extent of movement is limited by the insulating member 13 which is provided also with suitable slots and holes to secure the wiper cords which are wired to the wiper terminal tags 19.

The fixing screw 17 is provided with a flange which prevents it being screwed completely home and projections on one member engaging in holes in the other ensure the proper relative position of the two parts. Conveniently this positioning is effected as shown by the heads of the wiper assembly fixing screws 14 which are arranged to be a loose fit in the centreing holes of the upper supporting plate member 16. As shown in Fig. 2 there will be perceptible play between the upper and lower plates which allows of slight relative movement and a film of oil or similar liquid is introduced between the two plates. This serves to give a floating or cushioning effect to the wipers and thus mechanically insulates them from the carriage.

The invention therefore provides a simple construction whereby the vibration of a wiper tip on

I claim:

1. In a rotatable switch shaft wiper assembly, a plurality of wiper springs, a mounting member for said springs, a second member, means for mounting said second member on a switch shaft, means for loosely mounting said first member on said second member, said loose mounting providing space between said members, and a film of oil filling said space so that said members are mechanically insulated from one another to prevent vibrations of said second member from being transmitted to said wiper springs.

2. In a wiper assembly for a rotatable switch shaft, a plurality of springs, a plate for mounting said springs, a mounting bracket, a shoulder screw, said mounting bracket having an opening larger than the diameter of the shoulder of said screw and having thickness less than the length of said shoulder, said screw having a head larger than the diameter of said opening and screwed into said plate so that the shoulder portion of the screw contacts the surface of said plate, said mounting bracket having its surfaces covered with a film of oil to prevent mechanical vibrations from being transmitted between said mounting bracket and said plate.

3. In a wiper assembly for a rotatable switch shaft, a plurality of springs, a plate for mounting said springs, a mounting bracket, a shoulder screw, said mounting bracket having an opening larger than the diameter of the shoulder of said screw and having thickness less than the length of said shoulder, said screw having a head larger than the diameter of said opening and screwed into said plate so that the shoulder portion of the screw contacts the surface of said plate, said mounting bracket having its surfaces covered with a film of oil to prevent direct contact with said screw and said plate.

4. In an automatic switch wherein a wiper shaft is operated to select bank contacts, a wiper assembly comprising a plurality of wiper springs, a plate, means for rigidly clamping said springs to said plate, a mounting bracket, means for rigidly clamping said mounting bracket to the shaft of the automatic switch, means for loosely mounting said plate on said bracket, said loose mounting providing a space between the plate and the bracket, and vibration absorbing means in said space to prevent vibrations of said shaft from being transmitted to said springs.

5. In a wiper assembly used in the selection of bank contacts by an automatic switch, a pair of wipers, a plate, means for rigidly fastening said springs to said plate, a mounting bracket, means for rigidly mounting said bracket to the shaft of an automatic switch, a fluid carried by said bracket, and means for floatingly supporting said plate on said fluid to prevent vibrations of the switch shaft from being transmitted to said wipers.

6. In a wiper assembly as claimed in claim 5, wherein the floating support of said plate permits longitudinal and lateral movement of the plate with respect to said mounting bracket and means for limiting the extent of such movement.

DENIS WRIGHT.